United States Patent [19]

Spinu et al.

[11] Patent Number: 5,210,108

[45] Date of Patent: May 11, 1993

[54] DEGRADABLE FOAM MATERIALS

[75] Inventors: Maria Spinu, Wilmington; Thomas M. Ford, Greenville, both of Del.

[73] Assignee: E. I. Du Pont de Nemours and Company, Wilmington, Del.

[21] Appl. No.: 922,269

[22] Filed: Jul. 29, 1992

[51] Int. Cl.$^5$ ............................. C08J 9/14; C08J 9/28
[52] U.S. Cl. .................................. 521/182; 521/84.1; 521/138; 521/183; 521/189; 521/916; 527/300; 527/312; 528/354
[58] Field of Search ...................... 521/84.1, 182, 138, 521/183, 916, 189; 528/354; 527/312, 300

[56] References Cited

U.S. PATENT DOCUMENTS

| 4,719,246 | 1/1988 | Murdock et al. | 521/182 |
| 4,766,182 | 8/1988 | Murdoch et al. | 521/182 |
| 4,988,740 | 1/1991 | Walter et al. | 521/138 |
| 5,134,171 | 7/1992 | Hammel et al. | 521/182 |

Primary Examiner—Morton Foelak
Attorney, Agent, or Firm—Robert B. Stevenson

[57] ABSTRACT

Environmentally benign closed cell compositions made by foaming star-shaped polymers with a plurality of poly(hydroxy acid) chains attached to a central polyfunctional compound having a plurality of hydroxyl and/or amino groups.

19 Claims, No Drawings

DEGRADABLE FOAM MATERIALS

BACKGROUND OF THE INVENTION

1. Field of the Invention:

This invention relates to improved foam materials, particularly for food service and food packaging applications. These foams are made from starshaped polymers with a plurality of poly(hydroxyacid) chains (polylactide, polyglycolide, polycaprolactone, etc.) attached to a central polyfunctional compound having a plurality of hydroxyl and/or amino groups.

The materials of this invention are degradable, both biodegradable and hydrolyzable. Furthermore, they are foamed with environmentally benign gas and so contain no stratosphere ozone-depleting chemicals nor chemicals that have significant low altitude smog forming photochemical ozone producing reactivity. They have little global warming potential compared to chlorofluorocarbon (CFC) blowing agents. Thus, this invention provides readily degradable foam packaging materials with minimal environmental impact.

2. Description of the Related Art:

Copending and commonly assigned U.S. patent application Ser. No. 07/826,357, allowed Mar. 3, 1992, relates to poly(hydroxy acid) foam materials. The polymers for the foams of the present invention are branched star polymers containing hydroxy acidic acid units polymerized with other units that greatly enhance their foaming capabilities and the properties of the resultant foams.

At the present time, the most commonly used food service and food packaging materials are light weight closed cell foamed polystyrene, usually foamed with chlorofluorocarbon (CFC) or hydrocarbon (HC) blowing agents. These products pose serious environmental problems.

First, polystyrene is not degradable, either in landfills or as roadside litter. Thus, unless collected and recycled, polystyrene foam products have an unlimited litter life.

Second, CFC blowing agents trapped in the foam products, which make up a high volume percentage of the products, eventually escape to the stratosphere where the chlorine enters an ozone-depletion cycle.

Third, if HC blowing agents are used in place of CFCs, upon release from the foam they are photochemically reactive and thus promote smog formation. Also, they are flammable.

Thus, there is a need for light weight closed cell foam of a degradable resin foamed by a blowing agent that does not enter into chemical reactions that cause environmental damage.

Degradable polylactides are shown in Murdoch U.S. Pat. No. 4,766,182 (Aug. 23, 1988) and 4,719,246 (Jan. 12, 1988). These patents also disclose forming open cell porous structures by the extraction of solvent from polylactide gel. These open cell structures cannot be used for containers for wet foods such as meats and drinks. Also, to the extent any of Murdoch's blowing agents are present in the porous product, they are not environmentally benign.

Battelle WO 90/01521 published Feb. 22, 1990 discloses degradable polylactide resins, and their processing into solid films. The films may be made into "foam" structures by dissolving therein a mixture of petroleum ether and methylene chloride, and then placing the film into boiling water to volatilize the liquid mixture. The Battelle "foam" films are irregular and unsuitable. Also, upon degradation these products will release a high volume percent of hydrocarbons that are deleterious to the atmosphere.

Zhu et al "Super Microcapsules (SMC). I. Preparation and Characterization of Star Polyethylene Oxide (PEO)-Polylactide (PLA) Copolymers.", Journal of Polymer Science: Part A: Polymer Chemistry, Vol 27, pages 2151-2159 (1989) describe polymerization of lactide from 3-arm and 4-arm hydrophilic poly (ethylene oxide) with hydroxylterminated arms.

Polylactic acid (PLA) polymers often show a very rapid drop in melt viscosity with increasing processing temperature. At temperatures which are high enough to allow processing of semicrystalline PLA polymers, the melt viscosity drops very fast (partly because of thermal degradation). As a result, a number of PLA melts have a low melt strength, which may affect the foam-forming capacity of these polymers. An ideal foam-forming PLA polymer should combine a lower processing temperature to limit thermal degradation during processing with a higher melt strength to improve the foam-forming capacity. Such combination of desirable features are approached with branched (star) PLA polymers used in the foams of the present invention.

A number of blowing agents, including fluorohydrocarbons, are known in the art. Spitzer U.S. Pat. No. 4,422,877 (Feb. 4, 1982) shows the use of a number of blowing agents, including 1,1-difluoroethane, to form foams from a number of resins. However, no PHA foam articles are disclosed.

Walter U.S. Pat. No. 4,988,740 (Jan. 29, 1991, filed Jun. 15, 1989) discloses closed cell elastic foam material made from elastomeric polymer. No rigid foam products are disclosed.

"The Elements of Expansion of Thermoplastics", Part I and Part II, James G. Burt, Journal of CELLULAR PLASTICS, May/June 1979 (Part I) and November/December 1978 (Part II) disclose in detail the mechanics of meltfoaming thermoplastic resins. This article, while not disclosing PHA foams, sets forth a large number of requirements that must be met by the foaming ingredients to prepare an acceptable foam product, such as: amount of plasticization of the molten resin by the blowing agent; volatility of the blowing agent at foaming temperature; speed of solidification of the blown resin on cooling; heat transfer necessary for solidification; molecular migration of the blowing agent through the blown cell walls; melt viscosity and melt strength of the resin during the cooling/solidification; the rate of change of polymer viscosity with temperature; and a number of other properties. One concludes that the suitability of particular polymeric resins to be foamed can be determined only by trial and error.

HFC manufacture is known in the art. See "Aliphatic Fluorine Compounds", A. M. Lovelace et al. (1958), p. 55.

The above patents, patent application and literature references are incorporated herein in total and made a part of this patent application.

SUMMARY OF THE INVENTION

It has been found that certain polymers containing hydroxy acid units form excellent degradable environmentally benign light weight rigid closed cell foam structures when foamed by inert environmentally benign blowing agents. The products of the present invention are foam products, particularly packaging and food container products, comprising one or more specific thermoplastic polymers, the closed cells of which foam product enclose one or more fluorocarbon blowing agent. The polymers useful in the present invention foam products comprise star-shaped polymers having the residue of a central polyfunctional compound having 3 to 100 and preferably 3 to 20 hydroxyl or amino groups and 5 to 10,000 and preferably 5 to 100 carbon atoms with polymeric arms attached to the functional groups. The polymeric arms are formed from lactide, glycolide or caprolactone.

DESCRIPTION OF THE INVENTION

The foam products of the present invention comprise closed cell foam degradable thermoplastic polymeric resins containing at least 50% by moles of one or more star-shaped polymers wherein lactide is polymerized onto a polyfunctional hydroxyl or amino containing compound.

The polymers used in the foams of the present invention, and their preparation, are described in detail in copending and commonly owned U.S. patent applications Ser. No. 07/922,269.

The polyfunctional macroinitiator compound generally contains from 3 to 100 and preferably from 3 to 20 hydroxyl and/or amino groups, and from 5 to 10,000 and preferably from 5 to 100 carbon atoms. While sugars, such as monosaccharide or disaccharide hexoses or pentoses can be used, it is preferred to use a polyfunctional compound in which all of the functional groups are of the same reactivity, i.e., either all primary or all secondary. Such a polyfunctional compound is inositol, with six secondary OH groups. Furthermore, the high melting inositol can be reacted with a mixture of L- and D-lactide to produce a macroinitiator containing six short amorphous arms (about 800 g/mole) which are OH terminated. This initiator makes possible homogeneous initiation of lactide polymerization (the initiator is readily soluble in molten lactide and has readily available OH groups remote from the central hub of the initiator molecule).

Also suitable for use as polyfunctional compounds are oligomers or polymers of unsaturated monomers containing one or two hydroxy or amino groups. Suitable oligomeric or polymeric polyfunctional materials include poly (vinyl alcohol), and hydroxyethylmethacrylate containing from 10 to 5,000 and preferably from 10 to 20 repeating vinyl alcohol or hydroxyethylmethacrylate units.

The pendant polylactide groups forming the arms of the star can be copolymers of L-lactide and D-lactide or a polymer of greater than 98% L-lactide or greater than 98% D-lactide. The copolymers of 10–90% L-lactide and 90–10 D-lactide, and preferably 15–85% L-lactide and 85–15% D-lactide, provide amorphous polymers. The most preferred copolymers have an L/D ratio of at least 95/5. The polymers containing only one of greater than 98% L-lactide or greater than 98% D-lactide provide polymers having a crystallinity of about 37%. The all semicrystalline polylactide polymers generally melt above 173° C. and lactide begins to degrade thermally at about 180° C. For this reason, it is preferred to form a portion of the arms with amorphous polylactide and a portion of the arms with semicrystalline polylactide. This drops the melting point by 10° to 20° C., depending on the length of the semicrystalline blocks, while still retaining the superior physical characteristics of the semicrystalline polylactide. While either the amorphous or semicrystalline block can form the inner arm segment and the other type of block the outer arm segment, it is preferred that the inner arm segments adjacent the polyfunctional compound be amorphous and that the outer arm segments be semicrystalline. The individual inner arm segments generally will have a molecular weight of 1,000 to 50,000 and the outer arm segments a molecular weight of 1,000 to 50,000. The total molecular weight of the individual arms generally will be from 2,000 to 100,000, and preferably above 40,000.

Polycaprolactone or polyglycolide, alone or a copolymer of L,D or both lactides may be used to form the arms or preferably the inner arm segments.

The polymerization can be done either in bulk or in solution. Preferred solvents are toluene and the xylenes, for high temperature reactions and methylene chloride or chloroforms for low temperature reactions. Suitable reaction temperatures for solution polymerization range from $-100°$ to $300°$ C. with $-40°$ to $110°$ C. being the preferred range. Suitable reaction temperatures for bulk polymerization range from $100°$ to $220°$ C., with $160°$ to $200°$ C. being the preferred range. Any catalyst for ring opening of lactide, glycolide or caprolactone may b used for the polymerization step(s). Generally, stannous 2-ethylhexanoate (tin octanoate) is used for the polymerization, but other catalysts such as the yttrium or lanthanide series rare earth metal catalysts disclosed in U.S. Pat. No. 5,028,667 issued Jul. 2, 1991 to Drysdale and McLain can be used for the polymerization step(s). The polymerization reaction generally takes from 5 minutes to 72 hours depending on the temperature used and the amount of catalyst present. Generally, the ratio of monomer/catalyst is from 200/1 to 10,000/1. In the preferred aspect of the invention the mixture of L- and D-lactide is polymerized onto the polyfunctional compound until the monomer conversion is greater than 95% and further addition of the L-lactide or D-lactide is made, generally along with additional catalyst.

The polymer compositions will normally contain some unreacted monomers and low molecular weight oligomers. To avoid extrusion and foaming problems, it is desirable to keep the low molecular weight, under 450, units in the polymer composition to less than about 7-$\frac{1}{2}$%.

These polymers are degradable and are excellent for forming superior closed cell molded and moldable foam products.

Since the star polymers may have reactive groups at the ends of the arms, they are amenable to crosslinking. This can be done during direct thermoforming of the foam structure, giving a particularly rigid structure.

As is well known in the art, such polymers may be modified with minor amounts of various adjuvants such as stabilizers, fillers, plasticizers, nucleating agents and the like.

It has been found that these polymers have a superior combination of properties that make them outstanding for foaming, particularly adequate melt strength over a wide enough temperature range and low diffusion rate to contain the blowing agent. Particularly, they have low enough crystallinity and rate of crystal formation to allow an adequate temperature range of foamable melt viscosity of adequate strength to maintain cell integrity without heating too severely causing polymer degradation.

The resultant foamed products comprising resin and fluorocarbon are excellent low density rigid products, that although non-elastomeric, can be hot molded to shapes such as plates and cups that have good heat insulating properties. The densities are not over 20 pounds per cubic foot (pcf) and preferably under 10 pcf.

The polymer is converted to foam by nitrogen, carbon dioxide or a blowing agent of the formula:

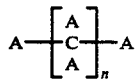 (5)

wherein all A's are independently hydrogen or fluorine, and n=1-4. The nitrogen, carbon dioxide and HFC of formula (5) are chemically compatible with and useable with conventional foam blowing equipment, and are thermally stable and chemically non-reactive during the blowing and subsequent thermoforming stages. A significant amount of blowing agent remains in the closed cells of the foam product for an extended period of time. Of course, air does diffuse into the individual cells.

The cells of these products are closed cells in a significant proportion even after hot molding, usually above 90% of the cells being closed before shaping and 50% after shaping. In its simplest concept, the present invention is the use of nitrogen, carbon dioxide or HFCs of the formula (5) as a foam blowing agent for specific resins to produce highly useful, environmentally superior foam products.

The preferred products of the present invention are a degradable resin foamed by and containing in closed cells an environmentally benign hydrofluorocarbon (HFC) blowing agent.

By "foam" is meant a low density microcellular structure consisting essentially of thin contiguous cell walls of 0.0003 to about 0.030 inches thickness each side of which forms a wall of one or more closed cells containing blowing agent. The cells have a maximum cell size of 0.03 inches.

The foams of the invention are rigid, in contrast to elastomeric. By "rigidity" is meant that when compressed, the films of the invention will be crushed and cell structure destroyed. They will not recover back to their precompression shape upon release of compression. Thus, the present products have little significant elastic recovery and cannot be severly compressed without cell destruction.

While some cell walls may be broken, the majority of cells of the present invention product are unbroken, giving the foam rigidity and structural strength. After being made, foam may be shaped by molding, calendaring, or cutting. The foams of the present invention, being essentially non-elastic, retain their shape when thermo molded.

The term "degradable" as used here with respect to the polymers means that the polymer is biodegradable and, more importantly, degradable by hydrolysis. The degradation rate is consistent with its intended usage, i.e., the product does not significantly degrade in normal storage and usage, but will degrade significantly in a reasonable time after discarding. For hydrolysis degradation, slightly acidic or basic conditions may be used advantageously. By hydrolysis degradation, monomer units can be recovered if desired for reconversion to useful polymers or can be discarded as an environmentally benign waste material.

Acceptable blowing agents must have the following properties:

environmental acceptability
low toxicity
appropriate volatility
adequate solubility
low reactivity
acceptable diffusion rate
relatively low molecular weight.

Environmental acceptability means that the blowing agent, when released from the foam product, will have no potential for stratospheric ozone depletion. In this regard, blowing agents containing chlorine atoms are unacceptable. Also, when released, the blowing agent must have a minimal infrared energy absorbability and appropriate atmospheric lifetime so that it will not have significant global warming potential, and also have negligible photochemical reactivity so as not to promote smog formation. Hydrocarbon blowing agents are unacceptable because they promote the formation of low level ozone.

Low toxicity of the blowing agent is required to protect employees during foam manufacture. Also, it must not be toxic in use of the foam products, which is of particular importance in food service and food packaging applications.

The blowing agent must also have appropriate volatility for use with the thermoplastic resins of the present invention. Such blowing agents must provide the solution pressure required to expand and foam the viscous polymeric resin.

The blowing agent must have adequate solubility in the molten polymer, which means that the blowing agent is readily contained in the molten polymer when present in the concentration required for the needed degree of foaming. If the blowing agent separates from the polymeric resin before expansion of the blowing agent, gas pockets or non-uniform foam density can be caused.

The blowing agent must have low reactivity, which means that it will not react with the resin or decompose under the typical temperatures and pressures conventionally used in thermoplastic resin foam production. Similarly, the blowing agent must be nonreactive under normal use so as to prevent product degradation.

An acceptable diffusion rate is necessary for the blowing agents in the foams of the present invention. A very slow diffusion rate is preferred so that the thermoforming of foamed sheet into shaped objects such as hamburger containers, plates, etc. is easily achieved.

A relatively low molecular weight blowing agent is desirable. Molecular weight determines the pounds of blowing agent needed to produce a given volume of gas. Thus, use of a low molecular weight blowing agent minimizes the blowing agent cost per unit of production.

It has been found that HFC blowing agents selected from those represented by formula (5) are ideally suited, with respect to the aforementioned properties, when used to make foam products with the polymeric resins of the units for formulae (1)–(4). Suitable HFC blowing agents of formula (5) used with a specific polymeric resin of the units of formulae (1)–(4) can be readily determined by conventional techniques.

The following HFCs are suitable blowing agents for the foams of the present invention:

| | |
|---|---|
| HFC-32 | CH2F2 |
| HFC-125 | CF3CF2H |

| | |
|---|---|
| HFC-134 | HCF2CF2F |
| HFC-134a | CF3CFH2 |
| HFC-143a | CF3CH3 |
| HFC-152 | CH2F—CH2F |
| HFC-152a | CH3—CHF2 |
| HFC-227 EA | CF3CHF—CF3 |
| HFC-356 MFF | CF3—CH2—CH2—CF3 |
| HCC-365 MFC | CF3—CH2—CF2—CH3 |

The preferred HFCs are those containing one and two carbon atoms.

The foam products of the present invention have a unique combination of properties making them environmentally acceptable both with respect to the atmosphere and also for disposal. Concerning disposal, they can be landfilled whereupon they will biodegrade and/or hydrolyze to harmless degradation products, or they can be recycled by hydrolysis depolymerization, preferably under slightly acidic or basic conditions, to form monomeric units that can be used in the production of polymer.

The foam products of the present invention can be made by conventional techniques. Thus, the polymeric resin with the blowing agent therein can be pressure extruded at an appropriate temperature below the degradation or reaction temperature of the resin and the blowing agent. These extruded products can be hot formed into desired shapes. The foamed products can be in the form of sheets or cast, molded or pressed shaped articles such as hamburger containers, trays, plates, boxes and the like. These products are particularly useful in food packaging and food service containers because of the combined properties of low toxicity and environmental acceptability.

The foam products can also be made directly into the desired shape by introducing the material to be formed into a mold or press of the desired shape which can be appropriately controlled in temperature and pressure to develop the desired shape. Cross-linking of the star polymer can be readily carried out in this type of direct product molding/thermoforming.

In addition to polymer and blowing agent, conventional adjuvants can be included. Typical adjuvants are nucleants such as calcium silicate talc; processing aids such as mineral oils; extrusion aids such as dioctylphthalate (DOP); and color concentrates. The concentrations of the additives are generally independent of the amount of blowing agent.

EXAMPLE 1

Preparation of macroinitiator

In a dry box, L-lactide (8.2 g, 56.94 mmol), D-lactide (1.40 g, 9.722 mmol), and inositol (0.40 g, 2.22 mmol) are weighed in an oven dried 100 ml onenecked round bottom flask equipped with a magnetic stirring bar. After charging the reactants, the reaction flask is fitted with a rubber septum secured in place with copper wire, and transferred into a hood. The reaction flask, maintained under a positive pressure of nitrogen at all times, is heated to 150° C. and reacted, without catalyst, to initiate ring opening of lactide by inositol OH groups. The initial reaction mixture is heterogeneous, as inositol (mp=224°-225° C.) is not readily soluble in molten lactide. However, after a few hours at 150° C., the reaction becomes homogenous and slightly viscous, as lactide units are polymerized off the OH groups of inositol initiator. The reaction is allowed to proceed for 12 hours before catalyst addition. 0.33 ml tin (SnOct) octanoate solution 0.1M in toluene [Monomer/Catalyst (M/Cat.)=2000/1] is then added and the reaction is allowed to proceed for additional 6 hours at 150° C. to complete lactide polymerization. The arm-length of macroinitiator is determined by the molar ratio of monomer/OH groups and it is approx 720 g/mole (or 5 lactide units) for the example described above. The final reaction mixture is dissolved in CH2Cl2, precipitated from hexane/methanol, 50/50 v/v, and dried in a vacuum oven at room temperature for 72 hours prior to use.

Characterization

Theoretical number average molecular weight (Mn)=4,320 (calculated from the molar ratio of Lactide/OH groups); Experimental Mn=5980 g/mole (titration, OH#); Mn=7,350 g/mole; Weight average molecular weight (Mw)=8890 g/mole; P/D=1.21; from Gel permeation chromatography (GPC), linear polystylene standard (PS STD); Glass Transition Temperature (Tg)=36° C. as determined by differential scanning calorimetry (DSC); No Tm (amorphous material).

EXAMPLE 2

Synthesis of amorphous 6-arm polylactide star

In a dry box, 15.4 g (106.94 m moles) L-lactide, 3.8 g (26.389 m moles) D-lactide, and 0.30 g (0.050 m moles) hexafunctional hydroxyl containing macroinitiator from Example 1 Mn 5,980 are weighed into an oven dried 100 ml. 3-necked round bottom flask equipped with overhead stirrer. The reaction flask is then transferred in a hood, placed under an inert atmosphere, and heated to 150° C., until the reaction mixture forms a homogeneous melt. 0.7 ml SnOct solution 0.1M in toluene is added (M/Cat.)=2000/1 molar ratio) and the reaction is allowed to proceed for 1 hour at 150° C. A viscous homogeneous melt is formed shortly after catalyst addition, and the viscosity increases with reaction time; however, stirring is possible throughout the reaction. The final reaction mixture is cooled to room temperature and dissolved in 200 ml CH2Cl2. The polymer is isolated by precipitation from hexane, and dried in a vacuum oven at room temperature for 24 hours.

Characterization

Mp=223,000 (GPC, linear PS STD); Tg=56° C. (DSC); no Tm (amorphous polymer)

EXAMPLE 3

Synthesis of polylactide 6-arm star with amorphous/-semicrystalline block structure In a dry box, 4.8 g (33.333 m moles) L-lactide, 1.6 g (11.111 m moles) D-lactide, and 0.30 g (0.050 m moles) hexafunctional hydroxyl containing macroinitiator from Example 1 (Mn 5,980) are weighed into an oven dried 100 ml. 3-necked round bottom flask equipped with overhead stirrer. The reaction flask is then transferred in a hood, placed under an inert atmosphere, and then heated to 150° C. without catalyst until the reaction mixture forms a homogeneous melt. When the reaction mixture becomes homogeneous, 0.25 ml SnOct solution 0.1M in toluene is added (M/Cat.=2000/1 molar ratio) and the reaction is allowed to proceed for 1 hour at 150° C., at which time the conversion of lactide is greater than 95%. A viscous homogeneous melt is formed shortly after catalyst addition, and the viscosity increases with reaction time. After 1 hour, a second monomer portion consisting of 12.8 g (88.888 m moles)

L-lactide is added and allowed to dissolve in the previous reaction mixture, under inert atmosphere. When the reaction mixture becomes homogeneous again, a second catalyst portion (0.5 ml SnOct 0.1M in toluene) is added, and the polymerization is allowed to proceed for 30 more minutes. Shortly after second catalyst addition the reaction viscosity increases considerably and the stirring becomes difficult. The final reaction mixture is cooled to room temperature and dissolved in 150–200 ml CH2Cl2. The polymer is isolated by precipitation from hexane, and dried in a vacuum oven at room temperature for 24 hours.

Characterization

Mp=218,000 (GPC, linear PS STD); Tg=56° C. (DSC); Tm=165° C.

EXAMPLE 4

Synthesis of fully semicrystalline 6-arm L-Polylactide Star

In a dry box, 19.2 (133.33 m moles) L-lactide, and 0.30 g (0.50 m moles) hexafunctional hydroxyl containing macroinitiator from Example 1 (Mn 5,980) are weighed into an oven dried 100 ml. 3-necked round bottom flask equipped with overhead stirrer. The reaction flask is then transferred in a hood, placed under an inert atmosphere, and heated to 150° C., until the reaction mixture forms a homogeneous melt. 0.7 m SnOct solution 0.1M in toluene is added (M/Cat.=2000/1 molar ratio) and the reaction is allowed to proceed at 150° C. A viscous homogeneous melt is formed shortly after catalyst addition, and the viscosity increases with reaction time. Approximately 10 minutes after catalyst addition the reaction can no longer be stirred and the polymerization is allowed to continue in the "solid state", without stirring, for 20 more minutes. The final reaction mixture is cooled to room temperature and dissolved in 200 ml CH2Cl2 using heat to ensure complete solution. The polymer is isolated by precipitation from hexane, and dried in a vacuum oven at room temperature for 24 hours.

Polymer properties

Mp=278,000 (GPC, linear PS STD); Tg=56° C. (DSC); Tm=173° C.

EXAMPLE 5

Synthesis of amorphous/semicrystalline 5-arm L/D polylactide star

In a dry box L-lactide (6.20 g, 0.0430 mole, D-lactide (2.10 g, 0.0140 mole), and alpha-D-glucose (0.30 g, 0.000166 mole) are weighed into an oven dried 100 ml, 3-necked round bottom flask equipped with overhead stirrer. The reaction flask is then transferred in a hood, placed under an inert atmosphere and heated to 150° C. without catalyst until the reaction mixture forms a homogeneous melt. When the reaction mixture becomes homogeneous 0.29 ml of 0.1M tin octoate is added (M/cat.-2000/1 molar ratio) and the reaction is allowed to proceed for 1 hour at 150° C. A viscous homogeneous melt is formed shortly after catalyst addition, and the viscosity increases with reaction time. After 1 hour, a second monomer consisting of 25 g (0.1736 mole) L-lactide is added and allowed to dissolve in the previous reaction mixture, under inert atmosphere. After all additional monomer is dissolved and the reaction mixture becomes homogeneous again, a second catalyst portion (0.9 ml tin octanoate 0.1M in toluene) is added, and the polymerization is allowed to proceed for 30 more minutes. Approximately 10 minutes after catalyst addition the reaction mixture can no longer be stirred and the polymerization is allowed to continue in the "solid state", without stirring, for 20 more minutes. The final reaction mixture is cooled to room temperature and dissolved in 200 ml CH2Cl2 using heat to ensure complete solution. The polymer is isolated by precipitation from hexane, and dried in a vacuum at room temperature for 24 hours. The overall L-lactide D-lactide ratio in the polymer is 93.7/6.3. the overall amorphous/semicrystalline content of the polymer is 25%/75%. The theoretical number average molecular weight of the amorphous segment of each arm is 10,000. The theoretical number average molecular weight of the semicrystalline segment of each arm is 30,000. The theoretical number average molecular weight of each arm is 40,000 and the total number average theoretical weight of the 5 arm polymer is 200,000. The polymer has a glass transition temperature of 54° C. and a melting point of 162° C.

EXAMPLE 6

Example 5 is repeated but varying the ratio of amorphous to semicrystalline segments in the five arms of the polymer.

(a) A polymer having an amorphous to semicrystalline ratio in each arm of 33.3%/66.6% wherein the amorphous segment has a theoretical number average molecular weight of 15,000, a theoretical total arm number average molecular weight of 45,000 and a total theoretical polymer number average molecular weight of 225,000 is found experimentally to have a Mp of 273,000, a glass transition temperature of 56° C. and a melting point of 160° C.

(b) A polymer having an amorphous to semicrystalline ratio in each arm of 37.56/62.5% wherein the amorphous segment has a theoretical number average molecular weight of 15,000, the semicrystalline segment has a theoretical number average molecular weight of 25,000 to provide a theoretical total arm number average molecular weight of 40,000 and a total theoretical polymer number average molecular weight of 200,000 is found experimentally to have Mp of 201,000, a glass transition temperature of 56° C. and a melting point of 160° C.

(c) A polymer with the arms formed of randomly polymerized L-lactide and D-lactide and a theoretical total polymer molecular weight of 2000,000 has an experimental Mp of 129,000, a glass transition temperature of 52° C. and a melting point of 146° C.

EXAMPLE 7

Continuous polymerization of a 3-arm polylactidestar polymer

To a 30 mm twin screw extruder is continuously fed 18 pounds per hour of L-lactide, 2 pounds per hour of D-lactide, 63 mL of a 0.5 molar toluene solution of tin octoate (for a monomer/catalyst ratio=2000/1), and 19 ml per hour of "Tone" 301 (trimethylol propane caprolactone oligomer sold by Union Carbide Co.). The product is quenched in water, pelletized and dried. Conversion via thermogravimetric analysis is 99%. Mn is 134,000, Mw/Mn is 1.5. Melt strength as measured according to Busse, J. Poly. Sci., Part A-2, Vol. 5, p. 1249 (1967) is 11.1 centiNewtons as compared to nil for a linear p-lactide prepared under similar conditions.

EXAMPLE 8

Foam Production

Following the procedure of Example 7, adequate quantities of the 3-arm star polymer are prepared for making foam. The foam is made by feeding to a 4½"-6" tandem extrusion system with annular die and mandrel a mixture of 2¼ lbs. per hour of calcium silicate talc nucleating agent and 472.5 lbs./hr. of molten polymer. Into the molten polymer in the extruder is introduced 25 lbs. per hr. of CF3-CFH2 (HFC-134a). The temperature of the material in the 4½" extruder is maintained at 400° F., and the pressure at 2500 lbs/sq. in. gauge. Prior to exiting the 6" extruder the temperature is dropped low enough to prevent cell collapse upon discharge from the extruder. The HFC comes out of solution in the polymer forming an oriented cell wall degradable thermoplastic closed cell foam product. This product is a rigid foam sheet 44 inches wide and 100 mils thick, having a density of 6 lbs. per cubic foot, with the individual cells containing HFC-132a.

The sheet foam is then heated, softened and stamped into 12" circular plates using a thermoformer. The plates are closed cell foams containing blowing agent.

Following the same procedures, sheets ranging from 50–100 mils thick are prepared and thermoformed into hinged food service containers.

EXAMPLE 9

Following the continuous polymerization technique of Example 7 and the foaming technique of Example 8, sheets of closed cell foams are formed from the polymers of Examples 2–6 and the ingredients listed below:

| Polymer of Example | Blowing Agent | M.W. | #/hr. | Polymer #/hr. | Calcium Silicate Talc Nucleator |
|---|---|---|---|---|---|
| 2 | CH2F2 (HFC-32) | 52 | 2.55 | 494.95 | 2.5 |
| 3 | CH3CHF2 (HFC-152a) | 66 | 3.24 | 494.26 | 2.5 |
| 4 | CF3—CH2F (HFC-134a) | 102 | 5 | 492.5 | 2.5 |
| 5 | CF3CHFCF3 (HFC-227 EA) | 170 | 8.33 | 489.17 | 2.5 |
| 6(a) | CF3CH2CF2CH3 (HFC-365 MFC) | 166 | 8.14 | 489.36 | 2.5 |
| 6(b) | N2 | 28 | 1.37 | 496.13 | 2.5 |
| 6(c) | CO2 | 44 | 2.16 | 495.34 | 2.5 |

What is claimed:

1. A rigid resin foam which is degradable by hydrolysis having a density of less than 20 pounds per cubic feet comprising cells having thin walls comprised of at least 50 molar % of star-shaped polymer having a central residue of a polyfunctional compound having 3–100 amino and/or hydroxyl groups and 5–10,000 carbon atoms, the central residue having polymeric arms with a number average molecular weight of 1,000–50,000 attached to the amino and/or hydroxyl groups which arms are formed of polylactide, polyglycolide, polycaprolactone or mixtures thereof, at least 50% of which cells are closed and contain a significant amount of inert environmentally benign blowing agent.

2. The foam composition of claim 1 wherein the arms comprise polylactide.

3. The foam composition of claim 2 wherein the arms consist essentially of poly L-lactide and/or poly D-lactide.

4. The foam composition of claim 3 wherein the arms consist essentially of poly L-lactide and D-lactide in a 95/5 ratio.

5. The foam composition of claim 3 wherein the polyfunctional compound has from 3 to 20 amino or hydroxyl groups and from 5 to 100 carbon atoms.

6. The foam composition of claim 5 wherein the central residue of a polyfunctional compound is a residue of a sugar or inositol.

7. The foam composition of claim 6 wherein the central residue of a polyfunctional compound in the residue of inositol.

8. The foam composition of claim 1 wherein the arms are formed of an amorphous inner segment adjacent the central polyfunctional compound residue and an outer semicrystalline segment.

9. The foam composition of claim 8 wherein the inner segment is a copolymer of 90 to 10 percent L-lactide, and the outer segment is a polymer of 98-100% L-lactide or 98-100% D-lactide.

10. The foam composition of claim 9 wherein the polyfunctional compound has from 3 to 20 amino or hydroxyl groups and from 5 to 100 carbon atoms.

11. The foam composition of claim 10 wherein the inner arm segments have number average molecular weights of 1,000 to 50,000 and the outer arm segments have molecular weight of 1,000 to 50,000.

12. The foam composition of claim 11 wherein the star-shaped polymer is cross-linked.

13. The foam composition of claim 11 wherein the central residue of a polyfunctional compound is a residue of a sugar or inositol.

14. The foam composition of claim 13 wherein the central residue of a polyfunctional compound is the residue of inositol.

15. A composition of claim 1 wherein the blowing agent is selected from the group consisting of nitrogen, carbon dioxide and compounds represented by the formula:

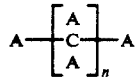

wherein all A's are independently hydrogen or fluorine, and n=1–4.

16. A composition of claim 1 wherein n=1.

17. A composition of claim 1 wherein n=2.

18. A composition of claim 1 capable of being formed into containers for hot and cold liquids.

19. A composition of claim 1 comprising a food container.

* * * * *